E. G. LOOMIS.
MACHINE TOOL.
APPLICATION FILED APR. 25, 1919.

1,396,332.

Patented Nov. 8, 1921.
3 SHEETS—SHEET 1.

INVENTOR
Everts G. Loomis
BY
Kiddle & Margeson.
ATTORNEY

UNITED STATES PATENT OFFICE.

EVARTS G. LOOMIS, OF NEWARK, NEW JERSEY.

MACHINE-TOOL.

1,396,332.  Specification of Letters Patent.  Patented Nov. 8, 1921.

Application filed April 25, 1919. Serial No. 292,589.

*To all whom it may concern:*

Be it known that I, EVARTS G. LOOMIS, a citizen of the United States, and a resident of Newark, county of Essex, State of New Jersey, have invented new and useful Improvements in Machine-Tools, of which the following is a specification.

My invention relates to an improvement in machine tools and has special reference to machines for cutting celluloid from blocks.

It is characteristic of machines used for this purpose that the forward end of the cutting tool or knife tends to be pulled against the work, or the work tends to be lifted by the knife from its table with the result that the sheet will be cut unevenly with reference to its thickness. Also with other types of machines at present in use for this purpose having automatic knife feeding mechanism, the control of this knife feed takes place at the same time and by the same means as the reversal of motion of the work table prior to the cutting stroke. This necessitates an almost instantaneous motion for the indexing of the feed, with the result that on account of the inertia and momenta of the parts it is very difficult to obtain accurate results with even a very limited range of feed, and also the rack and wear on the parts involved are very great. It is to obviate these difficulties, among other things, that I have provided the machine forming the subject-matter of this application.

Referring to the present apparatus broadly, I have provided a machine having a bed or stand upon which is mounted a table to which the work to be operated upon is clamped. This work table, as it may be called, is adapted to be reciprocated along the bed of the machine by hydraulic pressure. The crosshead carrying the knife or cutting tool is supported by a pair of uprights, one on each side of the machine, which crosshead is capable of being adjusted vertically for the purpose of setting the tool to take cuts of predetermined thickness; this adjustment of the crosshead and tool in the present device being accomplished by hydraulic pressure and controlled automatically. That is to say, if it is desired to cut sheets of ten thousandths of an inch in thickness, the feeding mechanism just referred to, is set and needs no further adjustment until the block of celluloid has been completely cut up. After which, of course, it is necessary to raise the knife to its original position where it may operate on a new block. Inasmuch as the cutting tool is being pulled downwardly as the cutting process proceeds, and inasmuch as there is a rearward thrust imparted to the knife at the same time, there will be imparted to the knife a thrust component which extends downwardly and rearwardly. It therefore becomes necessary to support the cutting tool in such a way that this thrust component will be taken care of. For this reason I have provided in the present machine screw-threaded members extending vertically of the machine, and through each of which passes a rod connected to the ends of the crosshead carrying the knife by which the crosshead may be adjusted vertically; the crosshead after adjustment being maintained in engagement with the top of the screw, just mentioned, by hydraulic pressure.

In addition to the means for reciprocating the work table and the feed for the tool, I have provided means whereby the crosshead or tool-sustaining means carrying the tool may be moved upwardly out of the way of the work as the table is moving on its return stroke; in this way obviating the marking of the surface of the celluloid by the tool. The operation of the machine so far described is automatic.

When it is desired to sharpen the cutting tool, the means above-mentioned for setting the tool may be caused to function to raise the crosshead and tool to the limit of its upward movement without causing the feeding mechanism to function or the work table to reciprocate.

In the accompanying drawings, wherein I have illustrated an embodiment of my invention, Figure 1 shows my improved machine in part sectional elevation.

Figure 1:
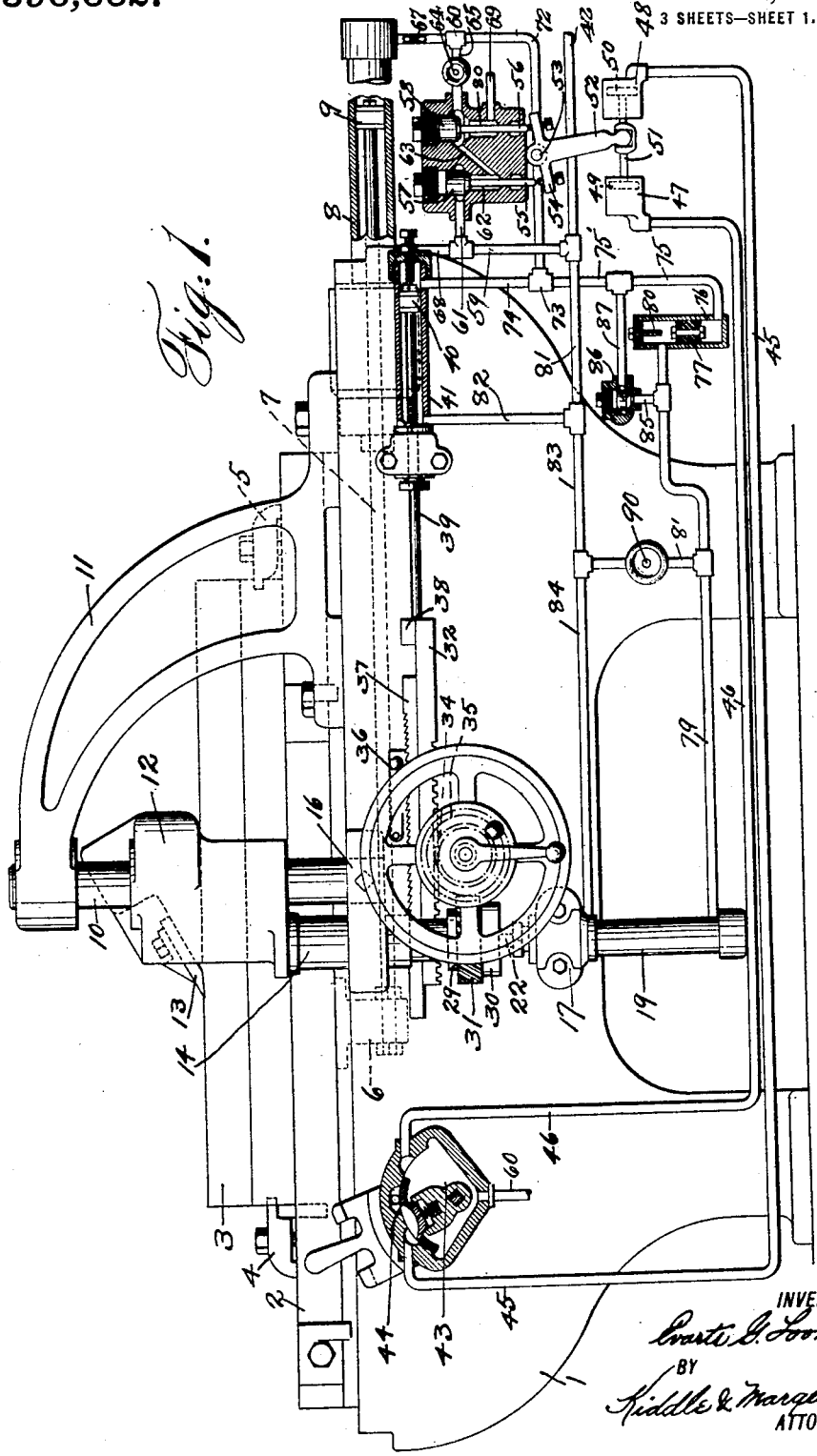
Figure 2:
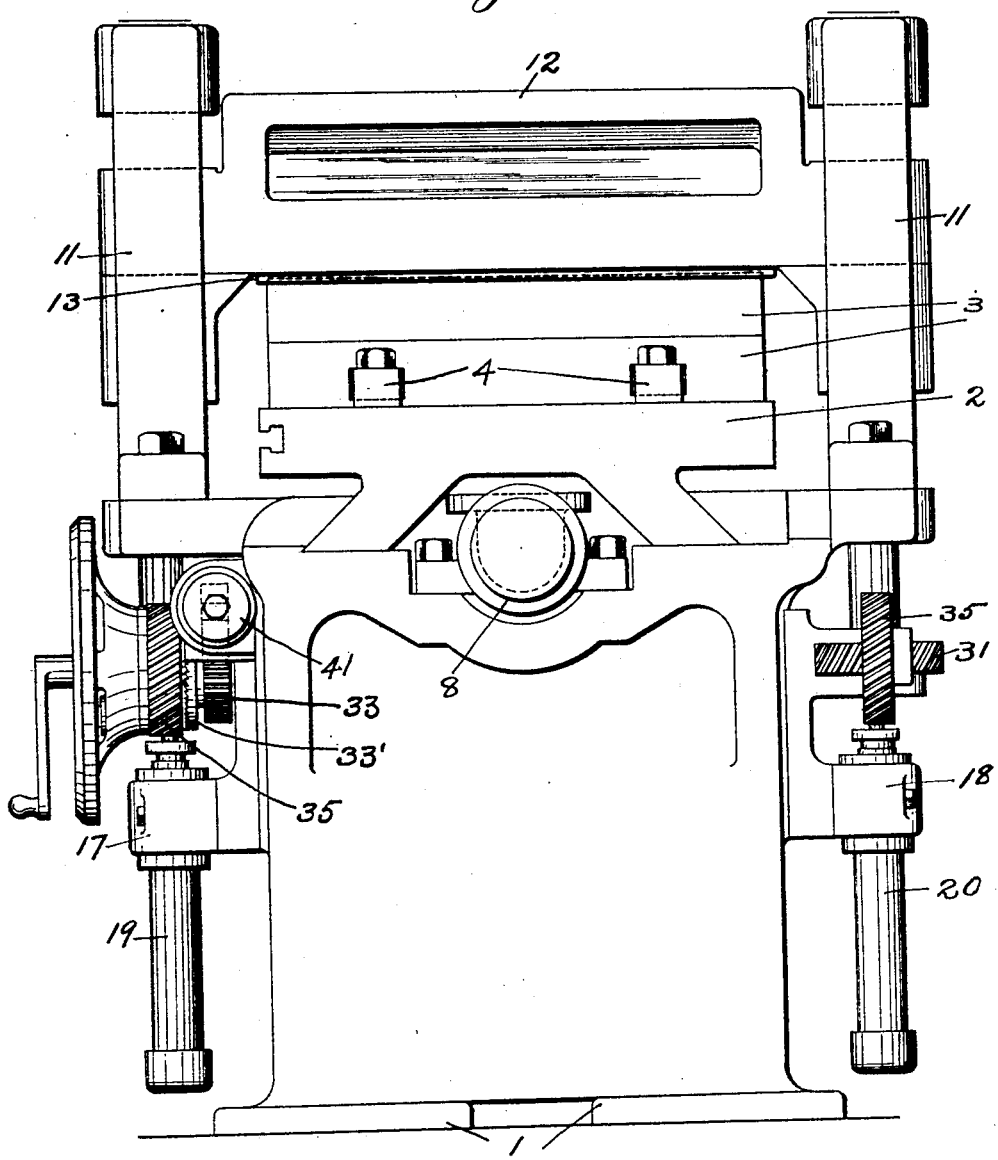
Fig. 2 is an end view of the machine of Fig. 1 looking from right to left.

Referring now to the drawings in detail: 1 designates the stand of the machine on which is mounted for reciprocation a work table, 2, to which the celluloid block, 3, is clamped by clamps 4 and 5. In this connection it is to be noted that by clamping the work, as I have shown, the latter will be held firmly in place so as not to bulge upwardly during the cutting operation, thus insuring an even cut. The work table carries a depending member, 6, to which is secured a piston rod, 7, best shown in Fig. 1 extending longitudinally of the machine to the rear thereof, where it enters a cylinder, 8; this rod carrying as its extreme right-hand end, as viewed in Fig. 1, a piston, 9. At each side of the machine are uprights, 10, clamped to the bed of the machine and braced by reinforcing members, 11. Mounted on the uprights, 10, and adapted to be moved vertically thereof, is a crosshead, 12, carrying the knife or cutting tool, 13.

Figure 3:
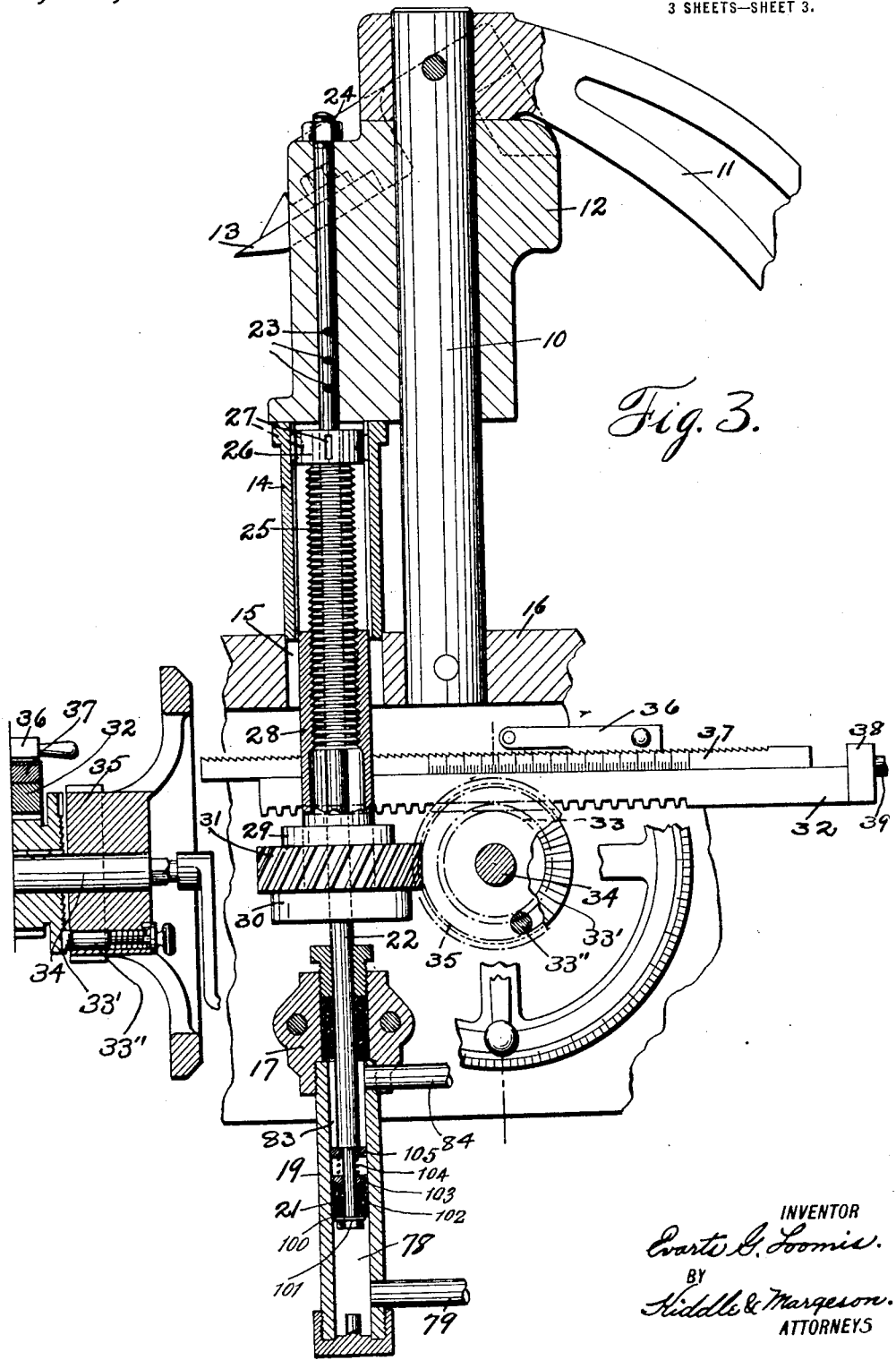
Fig. 3 shows in sectional elevation the feeding mechanism of Fig 1, with the parts in position assumed when the work-table is on its return stroke.

Secured to the underside of the crosshead, 12, at each end thereof, that is to say, on each side of the machine, are sleeves, 14, adapted to be moved vertically in an opening, 15, provided in each of the supporting members, 16, for the lower ends of the uprights, 10, (see Fig. 3). Secured to the frame of the machine by lugs, 17 and 18, are cylinders, 19 and 20, within each of which is a piston, 21, carried at the lower end of the piston rod, 22; these rods extending vertically of the machine through the sleeves, 14, and the crosshead, 12. Each rod, 22, is secured to the crosshead by pins, 23, and nut, 24. Within the sleeves, 14, and mounted on the rods, 22, are screw-threaded members, 25, having at the upper ends thereof a collar, 26, keyed to the sleeve, 14, by Woodruff keys, 27. The screws, 25, carry nuts, 28, held in position by lugs, 29 and 30, secured to the frame of the machine. Worm gears, 31, are mounted on the nuts 28 between the lugs, 29 and 30, just referred to. Thus it will be seen that upward movement of the piston rods, 22, will cause the crosshead, 12, to be moved vertically of the uprights, 10, carrying with it the knife, 13; the crosshead at that time being out of engagement with the collars, 26, at the upper end of the screw-threaded members, 25. Likewise, it will be obvious that if the nuts, 28, be rotated in the proper direction, the screw-threaded members, 25, may be caused to move downwardly; the screw-threaded members being held against rotation by the keys, 27.

The pistons within the cylinders 19 and 20 are in the present instance of special construction. At the lower end of the piston rod 22 is provided a packing ring 100 this packing ring being held in place on the piston rod by a nut and washer 101. Immediately above the packing ring 100 and around the piston rod 22 is packing 102, a packing ring 103 being mounted on the piston rod 22 above the packing 102, this ring being actuated toward the packing 103 by a coil spring 104 surrounding the piston rod. The spring abuts a member 105 which is secured to and may form a part of the piston rod 22. This arrangement is provided for the purpose of automatically taking care of wear in this device, and it will be seen that as the packing ring 100 and packing 103 wear away the packing will be automatically forced downwardly toward the ring 100 to always maintain a fluid tight connection.

For the purpose of imparting motion to the worm gears, 31, I provide a feeding mechanism which will now be described. This mechanism comprises a rack, 32, meshing with pinions, 33, running free on a shaft, 34, at each end thereof, the shaft extending transversely of the machine. The pinions are operatively connected to worm gears, 35, meshing with the worm wheels, 31, through ratchet mechanism comprising the members 33' and 33", the former being keyed to the shaft 34 so that as the rack, 32, is moved in one direction motion will be imparted to the pinions, 33, and thereby to the worm gears, 35, and to the worm wheels, 31; the rack moving in the opposite direction without imparting motion to the mechanism just referred to. The degree of movement of the rack, 32, is controlled by pawl and ratchet mechanism, 36 and 37; the rack, 32, being provided with a shoulder, 38, which, when the rack has reached the limit of its working stroke, will engage the end of the ratchet, 37 (see Fig. 3). The ratchet is adjustable longitudinally of the rack, 32, to vary the amount of movement which may be given to the latter. Secured to the right hand end of the rack, 32, is a piston rod, 39, carrying at its extreme right hand end a piston, 40, within a cylinder, 41.

Power for operating the machine is supplied from a pipe, 42, which may be connected to any suitable source of hydraulic pressure; this pipe having branches connecting with the cylinders, 8, 40, 19 and 20, above referred to. The central control of the machine is designated, 43, and comprises an automatically operable valve, 44, actuated by the work table and controlling a supply of water preferably at comparatively low pressure to pipes, 45 and 46; these pipes being in communication with cylinders, 47 and 48, within which are mounted pistons, 49 and 50 respectively, one on each end of the piston rod, 51. The piston rod, 51, is operatively connected to a lever, 52, which lever is pivoted at 53 and carries at the upper end thereof an arm, 54, arranged to engage the lower end of valve stems, 55 and 56, of valves 57 and 58 respectively. With all parts in the position shown in Fig. 1, the machine is performing a cutting operation, the work table having moved about half of its working stroke; the table being actuated by pressure from the pipe, 42, on the left hand side of the piston, 9, of the cylinder 8; the cylinder, 8, being in communication with the pipe, 42, through the branch pipe, 59. This movement of the work table will continue until the end of the working stroke is finished, at which time the movement of the table may be reversed by actuating the manually controlled valve, 44, to the right from the position shown in Fig. 1. Such movement of this valve will cause water to flow through the pipe 60 and pipe or conduit, 45, to the cylinder, 48, to cause the piston, 50, to be moved to the left, as viewed in Fig. 1, carrying with it the lower end of the lever, 52. The movement just noted of the lever, 52, will first permit valve 58 to close and then open the valve 57, and pressure will thus be applied to the right hand side of the piston, 9, to cause the work table, 2, to be actuated to the left, the water flowing through the pipes, 42, 59, 61, past the valve 57, passageways, 62, 63, around the valve 58, past valve 64, pipe 65, through fitting 66, restricted passageway, 67, and to the right hand side of piston 9. At this time it should be noted that the area of the right hand side of the piston, 9, is greater than that of the left hand side thereof, with the result that although the left hand side of the piston is in communication with the pressure supply, 42, the pressure on the other side of the piston will be higher to cause the piston and, therefore, the table, 2, to be moved to the left; the water flowing out of the cylinder, 8, by way of pipes, 68, 61, from thence by way of passages, 62, 63, and pipes, 65, 67, to the right hand side of the piston. In other words, at this time that part of the chamber, 8, to the left of the piston, 9, is not in communication with the exhaust pipe, 69.

With the parts in the position now assumed, water under pressure is free to flow through branch pipe, 72, fitting 73, to pipes, 74 and 75, the former communicating directly with the right hand side of the cylinder, 41, of the feeding mechanism; the latter communicating with a cylinder, 76, within which is a floating piston, 77; the upper part of which cylinder is in communication with the lower end, 78, of the cylinder, 19 and 20, by means of the pipes, 79. The cylinder, 76, is provided with a stop, 80, whereby the amount of movement of the floating piston, 77, is controlled, this top being adjusted so that the upward movement of the piston is sufficient to force water through the pipes, 79, to the chambers, 78, in sufficient quantity to cause the pistons, 21, to be moved upwardly, carrying with them the piston rods, 22, the crosshead, 12, and tool, 13. This is for the purpose of moving the tool away from engagement with the face of the celluloid being operated upon as the work table is moving on its return stroke to a position to resume the cutting operation. The water under pressure flowing from the pipe, 72, through the pipe, 74, and to the right hand side of the piston, 40, will cause the latter to travel to the left, actuating the rack, 32, in the same direction to cause the worm gears, 31, to be rotated through the medium of the mechanism described, to rotate the nuts, 28, to cause the screw-threaded members, 25, to be moved downwardly a predetermined amount depending upon the setting of the ratchet, 37, already referred to.

As soon now as the work table has reached the end of its return stroke, the manually operable valve, 44, is actuated to cause the lever, 52, to assume the position shown in Fig. 1. With the parts in this position, the pressure is applied to the left hand side of the piston, 9, by way of pipes, 59 and 68, and inasmuch as the valve, 58, is now in open position water from the cylinder, 8, to the right of the piston, 9, is free to flow by way of pipes 67, 65, valve, 64, and passageway, 80, to the waste pipe, 69. At the same time that portion of the cylinder, 41, to the left of piston, 40, is in communication with the pressure pipe, 42, by way of pipes 81 and 82; and that portion of the cylinder, 41, to the right of piston 40 is in communication with the waste pipe, 69, by way of pipes, 74, 72, 65, and passage, 80. At this time, also chambers, 83, at the upper part of the cylinders, 19 and 20, are in communication with the pressure pipe, 42, by way of pipes, 81, 83 and 84; and likewise the chambers, 78, at the bottom of the pistons, 19 and 20, are in communication with the waste pipe, 69, by way of pipes, 79, 85, check valves, 86, pipes, 87, 75′, 72, 65, and passage, 80. By reason of the fact that the chambers, 83, are in communication with the supply, 42, and the chambers, 78, are in communication with the waste pipe, 69, the pistons, 21, will be moved downwardly carrying with them the crosshead, 12, cutting knife, 13, to bring the crosshead into engagement with the collars, 26, at the upper end of the screws, 25, and hold it in such position throughout the cutting operation. It will be seen from the description thus far given that all play in the guiding and actuating means for the tool-sustaining means is automatically taken up.

The rack, 32, meanwhile has been restored to normal position due to the piston, 40, moving to the right, and the piston, 9, will now be moved to the right carrying with it the piston rod, 7, and work table, 3, to perform the cutting operation.

From the foregoing it will be obvious that I have provided a machine of the character described, wherein all the parts are operated by hydraulic pressure, and wherein the cutting knife is moved away from the work when the work table is on its return stroke, wherein the feed of the machine is controlled hydraulically during the return, noncutting stroke of the work table and operates automatically, and wherein the crosshead carrying the cutting tool, when the machine is in operation, is prevented from being pulled downwardly and rearwardly to spoil the face of the work and the accuracy of the thickness cut.

In order that the tool, 13, may be moved upwardly into a position wherein it may be sharpend or replaced with another tool, I have provided a manually operable valve, 90, whereby pressure may be admitted to the chambers, 78, beneath the pistons, 21, without however reciprocating the work table or disturbing the automatic feeding mechanism. It will be obvious that when this valve, 90, is again closed pressure may be admitted through the upper side of the piston, 21, to cause the same to move downwardly again to bring the crosshead, 12, and therefore the cutting tool, 13, into operative position once more.

It is to be understood that I have herein described merely one embodiment of my invention, and inasmuch as others skilled in the art may make various changes in the details of construction and arrangement of parts herein described without departing from the spirit and scope of my invention, I do not wish to be limited except by the scope of the appended claims. For instance, it is evident that instead of hydraulic power for operating the work table and the knife feeding mechanism, the more common drive for this type of machine by means of belt or motor driven clutches operating a screw through a nut, or a gear and rack motion may be substituted. Or in place of the hydraulic means for holding the crosshead down in contact with the feed screws, springs or weights may be used.

What I claim as new and desire to secure by Letters Patent of the United States is:

1. In a machine of the class described, movable tool-sustaining means, vertical guides for guiding the movement of said tool-sustaining means, said guides taking the horizontal thrust of the tool, and feeding means for the tool placed below the tool-sustaining means to take the downward vertical pressure of the tool.

2. In a machine of the class described, the combination of tool-sustaining means, a guide for the tool-sustaining means, and means for actuating said tool-sustaining means, the tool-sustaining means and the guide and actuating means therefor being arranged to automatically take up all play in the guide and actuating means before each cutting stroke.

3. In a machine of the class described, the combination of tool-sustaining means, tool feeding means, a piston rod connected with said tool-sustaining means and means for operating the piston rod to alternately bring the tool-sustaining means in and out of contact with the tool feeding means.

4. In a machine of the class described, the combination of a work table, actuating means therefor, tool-sustaining means, a support for the tool-sustaining means, and means for maintaining the tool-sustaining means, in fixed position relative to the said support therefor as the work table is actuated to perform the cutting operation.

5. In a machine of the class described, the combination of a work-table, tool-sustaining means, and hydraulic means for reciprocating the work-table and for adjusting the tool-sustaining means relatively thereto, the feed adjustment for said tool-sustaining means being made during the return or noncutting stroke of the work table.

6. In a machine of the class described, the combination of a work-table, tool-sustaining means, and automatically operable hydraulic means for reciprocating the work table and for adjusting the feed of the tool-sustaining means relatively thereto, during the return or noncutting stroke of the work table.

7. In a machine of the class described, the combination of a work table, tool-sustaining means, automatically operating hydraulic means for reciprocating the work table and for adjusting the tool-sustaining means relatively thereto, and automatically operating hydraulic means for controlling the movement of the tool-sustaining means whereby the latter will be moved away from the work table when the work table is actuated in one direction, and in the reverse direction prior to the work table moving in the opposite direction.

8. In a machine of the class described, the combination of a work-table, tool-sustaining means, hydraulic means for reciprocating the work table and for adjusting the tool-sustaining means relatively thereto, and a control for said hydraulic means whereby the tool-sustaining means will be moved away from the work-table as the latter is actuated in one direction and in the reverse direction prior to the work-table moving in the opposite direction.

9. In a machine of the class described, the combination of a work-table, tool-sustaining means, hydraulic means for reciprocating the work-table and for adjusting the tool-sustaining means relatively thereto, and a control for said hydraulic means whereby hydraulic pressure will be applied to the tool-sustaining means throughout the cutting operation.

10. In a machine of the class described, the combination of a work-table, tool-sustaining means, hydraulic means for reciprocating the work-table and for adjusting the tool-sustaining means relatively thereto, whereby the tool-sustaining means will be actuated in a direction away from the work-table as the latter is moved in one direction, and into operative position relatively to the work-table prior to the latter moving in the reverse direction, the degree of the last-named movement of the tool-sustaining means being controlled automatically.

11. In a machine of the class described, the combination of tool-sustaining means, a plurality of screws comprising feeding means for said tool-sustaining means, means for bringing the tool-sustaining means into positive engagement with said screws for the cutting stroke, and for actuating said tool-sustaining means to remove the strain from said screws during the return stroke.

12. In a machine of the class described, the combination of a work-table, tool-sustaining means, pistons operatively connected to said work-table and said tool-sustaining means, means for applying pressure to both faces of each of said pistons simultaneously, whereby the pistons will be actuated to actuate the work-table and tool-sustaining means.

13. In a machine of the class described, the combination of a work-table, tool-sustaining means, a support for the tool-sustaining means, pistons operatively connected to said work-table, said tool-sustaining means and said support for the tool-sustaining means, means for applying pressure to both faces of each of said pistons simultaneously, whereby the pistons will be actuated to actuate the work-table, tool-sustaining means and the supporting means for the latter.

14. In a machine of the class described, the combination of a work-table, tool-sustaining means, a support for the tool-sustaining means, pistons operatively connected to said work-table, tool-sustaining means, and support for the tool-sustaining means, a source of pressure always in communication with the same face of each of said pistons, and means for intermittently applying a higher pressure to the opposite faces of said pistons to cause the pistons and thereby the work-table, tool-sustaining means, and the tool-sustaining supporting means to be actuated.

15. In a machine of the class described, the combination of a work-table, tool-sustaining means, and supporting means for the latter, a source of hydraulic pressure, and hydraulically controlled lever-actuated valves for controlling said hydraulic pressure, whereby motion is imparted to said work-table, tool-sustaining means, and the support for the tool-sustaining means.

16. In a machine of the class described, the combination of a work-table, tool-sustaining means, hydraulic means for imparting reciprocating movement to said work-table and tool-sustaining means, and a floating piston for controlling the movement of said tool-sustaining means.

17. In a machine of the class described, tool-sustaining means, and actuating means therefor comprising a floating piston whereby said tool-sustaining means will be given a limited vertical movement.

18. In a machine of the class described, the combination of a work-table, tool-sustaining means, hydraulic means for imparting reciprocatory movement to the work-table, and for imparting movement to said tool-sustaining means, and controlling means for said tool-sustaining means whereby the latter may be actuated independently of the work-table.

19. In a machine of the class described, the combination of a work-table, tool-sustaining means, a support for the tool-sustaining means, hydraulic means for imparting motion to said work-table, tool-sustaining means and the support for the tool-sustaining means, and means for varying the amount of movement of the latter.

20. In a machine of the class described, the combination of a work table, tool-sustaining means, and rack and pinion mechanism actuated by hydraulic pressure for adjusting the feed of the tool-sustaining means relatively to the work-table, during the return stroke of work table.

21. In a machine of the class described, the combination of tool-sustaining means, feeding means therefor comprising a hydraulic piston and an adjustable ratchet for limiting and controlling the stroke of said piston and thereby the movement of said feeding means.

This specification signed this 23rd day of April, A. D. 1919.

EVARTS G. LOOMIS.